(12) United States Patent
Venugopalan Nair Jalakumari et al.

(10) Patent No.: US 10,097,264 B2
(45) Date of Patent: Oct. 9, 2018

(54) SINGLE PHOTON AVALANCHE DIODE MODULE FOR COMMUNICATIONS

(71) Applicant: STMicroelectronics (Research & Development) Limited, Buckinghamshire (GB)

(72) Inventors: Aravind Venugopalan Nair Jalakumari, Edinburgh (GB); Neale Dutton, Edinburgh (GB)

(73) Assignee: STMICROELECTRONICS (RESEARCH & DEVELOPMENT) LIMITED, Buckinghamshire (GB)

( * ) Notice: Subject to any disclaimer, the term of this patent is extended or adjusted under 35 U.S.C. 154(b) by 0 days.

(21) Appl. No.: 15/609,931

(22) Filed: May 31, 2017

(65) Prior Publication Data

US 2018/0115364 A1 Apr. 26, 2018

(30) Foreign Application Priority Data

Oct. 26, 2016 (EP) ..................... 16195849

(51) Int. Cl.
*H04B 10/00* (2013.01)
*H04B 10/11* (2013.01)
(Continued)

(52) U.S. Cl.
CPC ........... *H04B 10/11* (2013.01); *H04B 10/116* (2013.01); *H04B 10/1143* (2013.01);
(Continued)

(58) Field of Classification Search
CPC .............. H04B 10/112; H04B 10/1121; H04B 10/1123; H04B 10/114; H04B 10/1143;
(Continued)

(56) References Cited

U.S. PATENT DOCUMENTS

| 8,917,388 | B2 * | 12/2014 | Tenhunen | ................. G01J 3/02 356/301 |
| 2004/0208596 | A1 * | 10/2004 | Bringans | .............. H04B 10/801 398/130 |

(Continued)

FOREIGN PATENT DOCUMENTS

CN  101232327 A  7/2008

OTHER PUBLICATIONS

Fisher, Edward, et al., "A Reconfigurable 14-bit 60GPhoton/s Single-Photon Receiver for Visible Light Communications", ESSCIRC 2012, 4 pages.
(Continued)

*Primary Examiner* — Hanh Phan
(74) *Attorney, Agent, or Firm* — Slater Matsil, LLP

(57) ABSTRACT

A single photon avalanche diode based apparatus comprising: at least one array of single photon avalanche diodes configured to receive light generated externally to the apparatus, wherein the at least one array is configurable to be sub-divided into a plurality of sub-arrays, each sub-array able to receive a separate free space light communication channel; and a receiver configured to receive the output from each sub-array and output data based on the received plurality of sub-array separate free space light communication channel.

18 Claims, 14 Drawing Sheets

(51) Int. Cl.
*H04B 10/50* (2013.01)
*H04B 10/66* (2013.01)
*H04B 10/114* (2013.01)
*H04B 10/116* (2013.01)

(52) U.S. Cl.
CPC ......... *H04B 10/502* (2013.01); *H04B 10/503* (2013.01); *H04B 10/66* (2013.01)

(58) Field of Classification Search
CPC . H04B 10/1149; H04B 10/116; G01S 7/4865; G01S 7/4808; G01S 7/4863; G01S 17/89; G01S 17/42
USPC ....... 398/118, 119, 127, 128, 129, 130, 131, 398/194, 195, 162, 158, 159, 115, 172, 398/135, 136, 137, 138, 192, 193, 196, 398/189; 356/5.01, 4.01, 3.01; 250/551, 250/214 AL
See application file for complete search history.

(56) References Cited

U.S. PATENT DOCUMENTS

| | | | | |
|---|---|---|---|---|
| 2007/0182949 | A1* | 8/2007 | Niclass | G01C 3/08 356/3 |
| 2009/0110406 | A1* | 4/2009 | Morris | H04B 10/1121 398/131 |
| 2013/0236183 | A1 | 9/2013 | Chao et al. | |
| 2015/0124241 | A1* | 5/2015 | Eisele | G01C 3/08 356/5.01 |
| 2015/0261502 | A1* | 9/2015 | Sartor | G06F 7/588 359/107 |
| 2016/0054447 | A1* | 2/2016 | Sun | G01S 17/89 356/5.01 |
| 2016/0204866 | A1* | 7/2016 | Boroson | H04B 10/1121 398/97 |

OTHER PUBLICATIONS

Fisher, Edward, et al., "A Reconfigurable Single-Photon-Counting Integrating Receiver for Optical Communications", IEEE Journal of Solid-State Circuits, vol. 48, No. 7, Jul. 2013, pp. 1638-1650.

Almer, Oscar, et al., "A SPAD-based Visible Light Communications Receiver Employing Higher Order Modulation", Global Communications Conference (GLOBECOM), 2015 IEEE, 6 pages.

Gnecchi, Salvatore, et al., "Analysis of Photon Detection Efficiency and Dynamic Range in SPAD-Based Visible Light Receivers", Journal of Lightwave Technology, vol. 34, No. 11, Jun. 1, 2016, pp. 2774-2781.

* cited by examiner

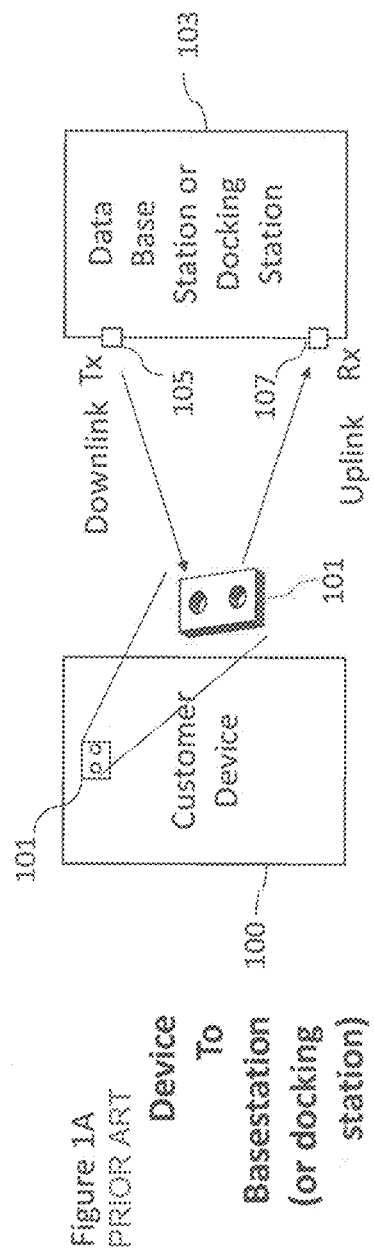
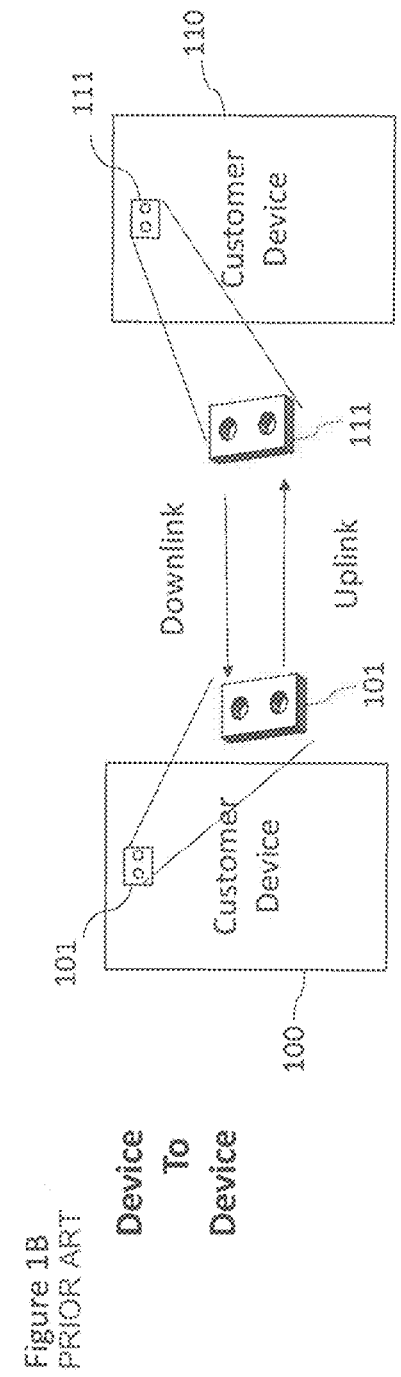
Figure 1A
PRIOR ART
Device To Basestation (or docking station)
Figure 1B
PRIOR ART
Device To Device

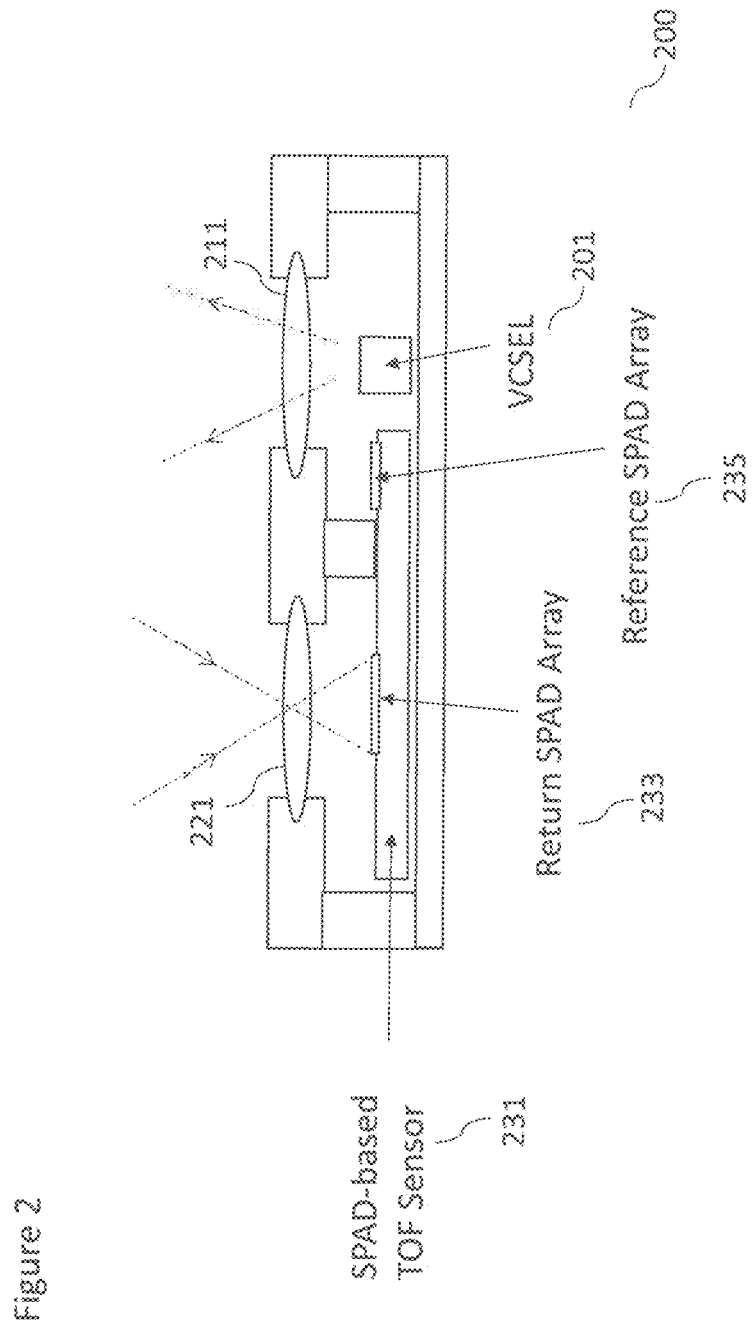

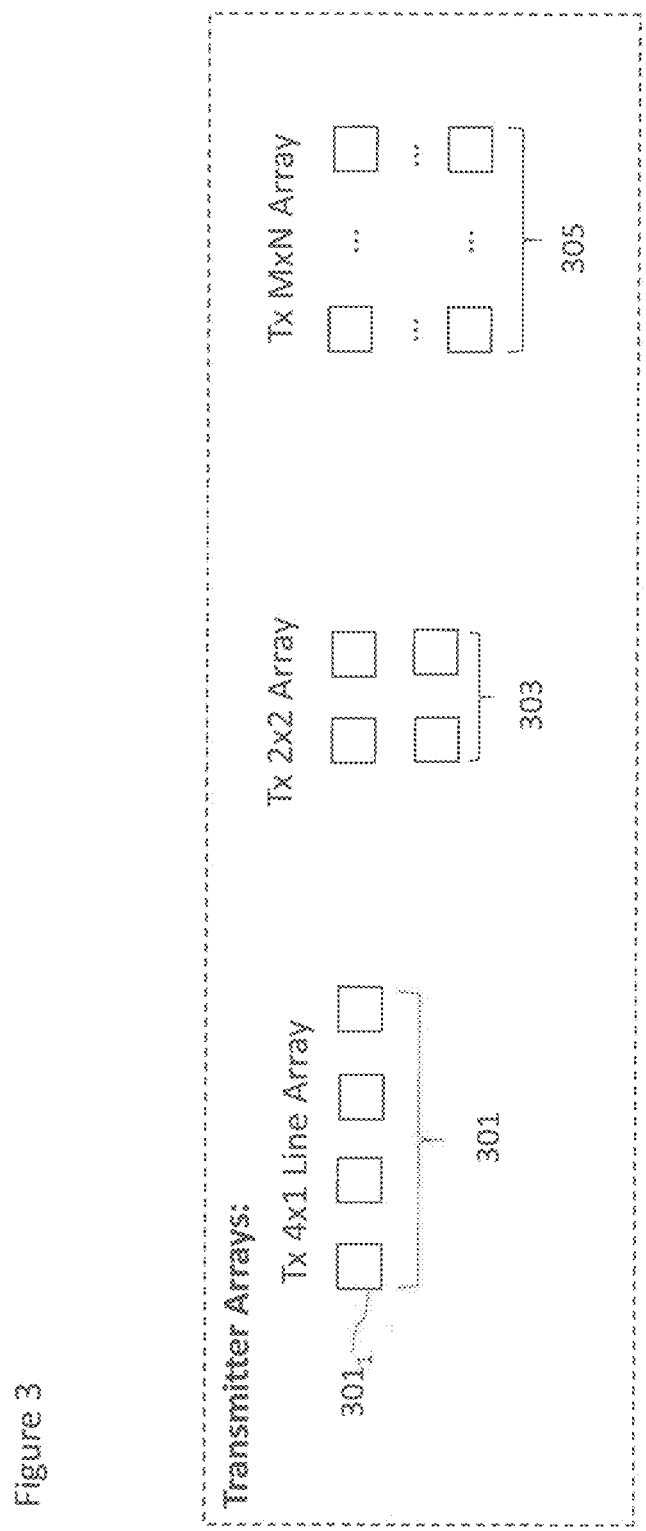

SINGLE PHOTON AVALANCHE DIODE MODULE FOR COMMUNICATIONS

CROSS-REFERENCE TO RELATED APPLICATIONS

This application claims priority to European Patent Application No. 16195849.1, filed on Oct. 26, 2016, which application is hereby incorporated herein by reference.

TECHNICAL FIELD

Some embodiments relate to a single photon avalanche diode module for communications.

BACKGROUND

The use of light for communications is known. Optical fiber communications are well developed and free space communications systems for example using infra-red diodes and photodiode sensors have been specified for example by the Infrared Data Association (IrDA) to communicate data between devices. Other free space light communication systems include light fidelity (Li-Fi) communications, which is a bidirectional high speed and fully networked wireless communication technology similar to Wi-Fi. It uses a form of visible light communication to complement radio frequency communication such as from Wi-Fi or cellular networks and can use visible light, infrared or near ultra-violet frequency spectrum rather than radio frequency spectrum to communicate data.

However light based communication systems operating in free space are typically low data rate systems. The power of the light sources is strictly limited and therefore the achievable signal to noise ratio is limited which in turn limits the modulation levels available.

With respect to FIGS. 1A and 1B typical light based communication systems are shown. FIG. 11A shows a first example wherein a customer device 100, such as a mobile phone or other electrical device, comprises a single photon avalanche diode (SPAD) Time of Flight (TOF) module 101. The SPAD TOF module 101 itself comprises a suitable transmitter element which may be any suitable light source. For example as described hereafter the light source is in the form of a Vertical Cavity Surface Emitting Laser (VCSEL) configured to generate an 'uplink' communications channel. However the light source may for example be any type of laser or light emitting diode. The SPAD TOF module 101 further comprises a single photon avalanche detection (SPAD) array which is configured to receive light and measure the intensity (or determine a count value which is proportional to the light intensity) of the received light and which can be used as the receiver for a 'downlink' channel. FIG. 1A furthermore shows a base station 103. The base station 103 may further comprise a light source 105 (which may be a further VCSEL) which operates as the transmitter for the downlink and a light sensor 107 (which may be a further SPAD) which operates as the receiver for the uplink. The base station 103 in some embodiments may be any suitable base or docking station and which may comprise a mechanical locating means for enabling the customer device 100 to be located relative to the base station 103 to optimize the communication light paths between the customer device 100 and the base station 103.

FIG. 1B shows a further example where a first customer device 100 (such as described with respect to FIG. 1A) and a first SPAD TOF module 101 is configured to communicate with a second customer device 110 which comprises a second SPAD TOF module 111. Communication between two customer devices may not produce as good a quality communications link as the docking station/base station system due to relative motion between the two devices.

However such communications systems have problems maintaining high data rates, for example data rates of the order of hundreds of megabits per second (~100 Mps) are difficult to achieve.

SUMMARY

Some embodiments relate to an apparatus and in particular but not exclusively to an apparatus with an array of photosensitive devices.

According to a first aspect, a single photon avalanche diode based apparatus comprises at least one array of single photon avalanche diodes configured to receive light generated externally to the apparatus. The at least one array is configurable to be sub-divided into a plurality of sub-arrays, each sub-array able to receive a separate free space light communication channel. A receiver is configured to receive the output from each sub-array and output data based on the received plurality of sub-array separate free space light communication channel.

Each of the sub-arrays may comprise an arrangement of diode elements, and the apparatus may further comprise at least one processor configured to generate at least one array intensity map. The at least one array intensity map comprises values of light intensity for each diode element based on the output of the at least one array.

The processor may be further configured to detect, within a sub-array diode element, a free space light communication channel.

The processor may be further configured to detect, within the sub-array diode element, a further free space light communication channel.

The processor may be further configured to deactivate the sub-array diode element such that no sub-array diode element receives more than one free space light communication channel.

The processor may be further configured to generate a feedback message configured to control the number and/or arrangement of free space light communication channels to be transmitted to the apparatus.

The apparatus may further comprise at least one array of illumination source elements configured to generate light. Each element may be configurable to generate light for a transmitted spatially separate free space light communication channel. The feedback message may be transmitted from the apparatus over the transmitted spatially separate free space light communication channel.

The illumination source elements may comprise: vertical cavity surface emitting laser elements; and/or light emitting diode elements.

The apparatus may be a time of flight single photon avalanche diode based range detecting module.

The apparatus may be a single photon avalanche diode based optical communications module.

The apparatus may be a single photon avalanche diode based ambient light sensor.

According to a second aspect, a single photon avalanche diode based apparatus includes at least one array of illumination source elements configured to generate light. Each element is configurable to generate light for a spatially separate free space light communication channel.

The illumination source elements may comprise vertical cavity surface emitting laser elements and light emitting diode elements.

The apparatus may further comprise at least one array of single photon avalanche diodes configured to receive light generated externally to the apparatus. The at least one array is configurable to be sub-divided into a plurality of sub-arrays, each sub-array able to receive a separate free space light communication channel. A receiver is configured to receive the output from each sub-array and output data based on the received plurality of sub-array separate free space light communication channel. The receiver is configured to receive a feedback message and a processor configured to control the array of illumination elements so to maintain the spatial separation of the free space light communication channels.

The apparatus may be a time of flight single photon avalanche diode based range detecting module.

A communications system may comprise a first device comprising the single photon avalanche diode based apparatus as discussed above, configured to provide a dynamically adjustable number of spatially separate free space light communication channels. The system may also include a second device comprising the single photon avalanche diode based apparatus as discussed above, configured to receive the dynamically adjustable number of spatially separate free space light communication channels.

According to a third aspect there is provided a method for operating single photon avalanche diode based apparatus. The method comprises configuring at least one array of single photon avalanche diodes to receive light generated externally to the apparatus by sub-dividing the at least one array into a plurality of sub-arrays, each sub-array able to receive a separate free space light communication channel. The output from each sub-array is received and data is output based on the received output from the plurality of sub-array separate free space light communication channels.

The method may further comprise providing each of the sub-arrays with an arrangement of diode elements, and receiving the output from each sub-array may comprise generating at least one array intensity map. The at least one array intensity map comprises values of light intensity for each diode element based on the output of the at least one array.

Receiving the output from each sub-array may further comprise detecting, within a sub-array diode element, a free space light communication channel.

Receiving the output from each sub-array may further comprise detecting, within the sub-array diode element, a further free space light communication channel.

Receiving the output from each sub-array may further comprise deactivating the sub-array diode element such that no sub-array diode element receives more than one free space light communication channel.

The method may further comprise generating a feedback message configured to control the number and/or arrangement of free space light communication channels to be transmitted to the apparatus.

The method may comprise transmitting the feedback message using at least one array of illumination source elements configured to generate light, wherein the each element is configurable to generate light for a transmitted spatially separate free space light communication channel.

According to a further aspect there is provided a method for operating a single photon avalanche diode based apparatus comprising configuring at least one array of illumination source elements to generate light. The each element is configurable to generate light for a spatially separate free space light communication channel.

The method may further comprise: receiving light generated externally to the apparatus using at least one array of single photon avalanche diodes. The at least one array is configurable to be sub-divided into a plurality of sub-arrays, each sub-array able to receive a separate free space light communication channel. The output from each sub-array is received and data is output based on the received plurality of sub-array separate free space light communication channel, wherein the data comprises a feedback message. The array of illumination source elements is controlled so to maintain the spatial separation of the free space light communication channels.

BRIEF DESCRIPTION OF THE DRAWINGS

Some embodiments will now be described by way of example only and with reference to the accompanying Figures in which:

FIGS. 1A and 1B show a schematic view of an example known communications system apparatus;

FIG. 2 shows a schematic view of an example SPAD TOF module suitable for employing in some embodiments;

FIG. 3 shows a schematic view of example transmitter array configurations suitable for implementing within the SPAD TOF according to some embodiments;

DETAILED DESCRIPTION OF ILLUSTRATIVE EMBODIMENTS

Figure 4:
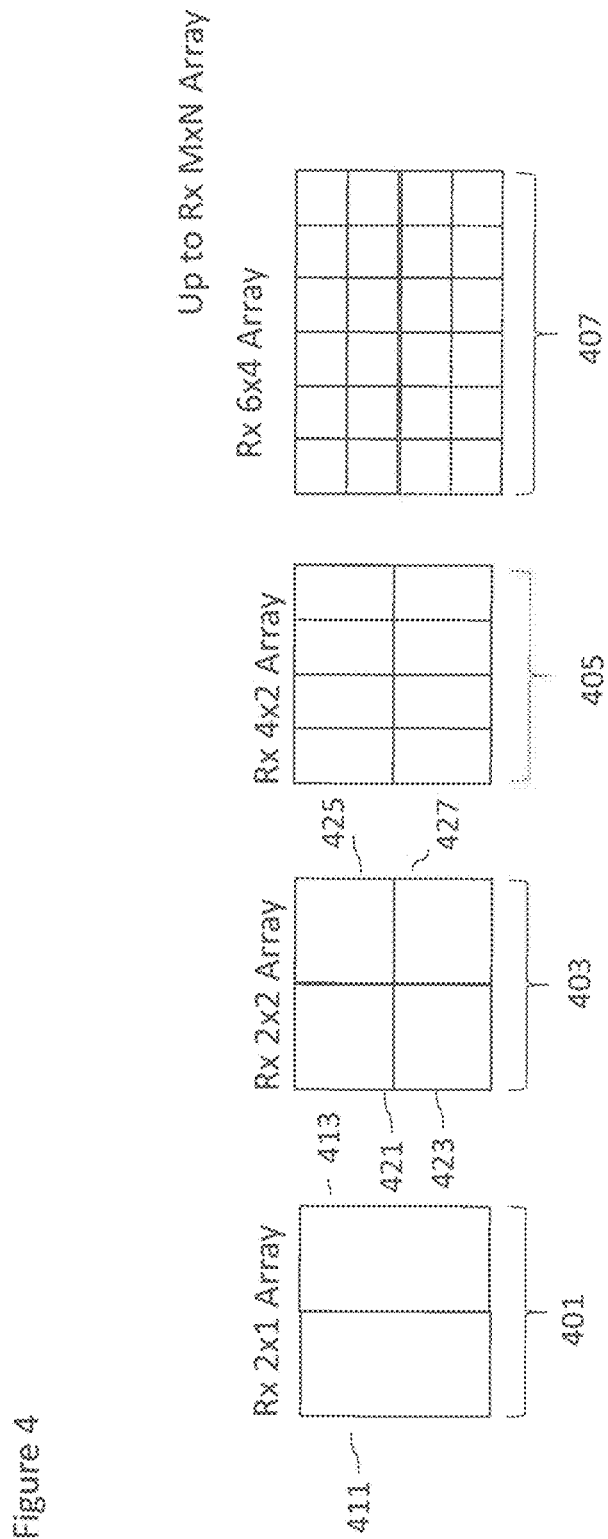
FIG. 4 shows a schematic view of example receiver array configurations suitable for implementing within the SPAD TOF according to some embodiments.

The concept as employed herein is to implement and configure a SPAD TOF sensor module to enable multiple spatial channels to be transmitted and received in order to increase the possible data rate. Furthermore in some embodiments it may be possible to adaptively control the SPAD TOF sensor module to control the number of spatial channels generated.

An example of a suitable SPAD TOF sensor module which may be employed according to some embodiments is shown in FIG. 2. In FIG. 2 the SPAD TOF sensor module 200 comprises at least one VCSEL 201 which is configured to generate at least one illumination profile, beam or 'spot'. In some embodiments the VCSEL 201 comprises multiple separately controllable VCSEL elements. Each of these elements is configured to be separately controllable and generate a separate spatially separate illumination element or 'spot'. Although the following examples show the use of the VCSEL elements as illumination elements, any suitable illumination source may be employed. For example the illumination elements may be any suitable type of laser and/or any suitable light emitting diode.

The module may further comprise a diffraction surface or lens surface 211. The generated light may pass through the diffraction or lens surface 211 and the output of which results in defined multiple spatially separated light pattern elements.

The module may furthermore comprise a SPAD based time of flight sensor 231. The SPAD based time of flight sensor 231 may comprise a first reference SPAD array 235 configured to receive internally reflected light from the VCSEL 201. Furthermore the SPAD based time of flight sensor 231 may comprise a return SPAD array 233. The return SPAD array 233 is configured to receive and detect light and generate (in either digital or analog form) a signal.

In some embodiments the module may furthermore comprise a lensing element 221 configured to focus the incoming or returning light to the return SPAD array 233.

Although the module may be employed in conventional SPAD time of flight applications whereby a return path distance between the VCSEL and the Return SPAD array is measured a communications application of the same component is able may be used as a transmitter and receiver as described hereafter.

With respect to FIG. 3, the VCSEL 201 shown in FIG. 2 is described in further detail. In particular FIG. 3 shows a series of example VCSEL 'transmitter' arrays. For example the first transmitter array 301 shows an array of VCSEL elements (one of which is labelled $301_1$) as a line array. Each element is configured to generate a separate controllable light beam or spot. The first transmitter array 301 example shows the array as a 4×1 line array. However other line array configurations may be employed using more than or fewer than four elements.

A further example transmitter array is shown by the second array 303 which shows a 2×2 square array of VCSEL elements. More generally, as shown by the third transmitter array 305 the transmitter array may be described as an M×N array of illumination elements.

Although the three examples shown in FIG. 3 show regular array spacing and arrangements (with regular spacing between VCSEL or illumination elements) it is understood that the multiple VCSEL elements may be distributed or arranged in any suitable manner (for example according to a circular symmetrical pattern or actually in an regular or irregular configuration).

With respect to FIG. 4, the return SPAD array 233 shown in FIG. 2 is described in further detail. In particular FIG. 4 shows a series of example return SPAD array 'receiver' arrays. The 'receiver' arrays are configured in such a manner that each sub-array of the array is able to output a detection or light intensity value independent from each other. In other words a sub-array of the array may comprise a plurality of SPADs which can detect (the occurrence and/or intensity) of light striking the array element. For example a first receiver array 401 shows a first configuration where the SPAD return array is sub-divided into 2 sub-arrays (a left sub-array 411 and a right sub-array 413) to form a 2×1 receiver array.

A second example receiver array 403 is shown where the SPAD return array is sub-divided as a 2×2 array and therefore split into 4 sub-arrays (top left 421, top right 425, bottom left 423, bottom right 427). This arrangement or configuration of the sub-divisions of the SPAD return array may be any suitable arrangement or configuration and may be generalized as a M×N array of sub-arrays. For example the third receiver array 405 shows an array of sub-arrays arranged with four columns and two rows of sub-arrays. The fourth receiver array shows a receiver array 407 where the SPAD return array is divided into six 'columns' and four 'rows' of sub-arrays.

Although the examples shown in FIG. 4 show regular array spacing and arrangements (with regular spaced and sized SPAD return array sub-arrays) it is understood that the SPAD return array sub-arrays may be distributed or arranged in any suitable manner (for example different sized sub-arrays in any regular or irregular configuration or a non-linear arrangement). In some embodiments the shaping and arrangement of the transmitter and receiver arrays match or are at least complimentary such that the transmitter array is designed such that a good (or practically perfect) alignment between a transmitter and receiver causes each 'spot' generated by a (VCSEL) transmitter array element to strike an associated receiver array sub-array.

Figure 5:
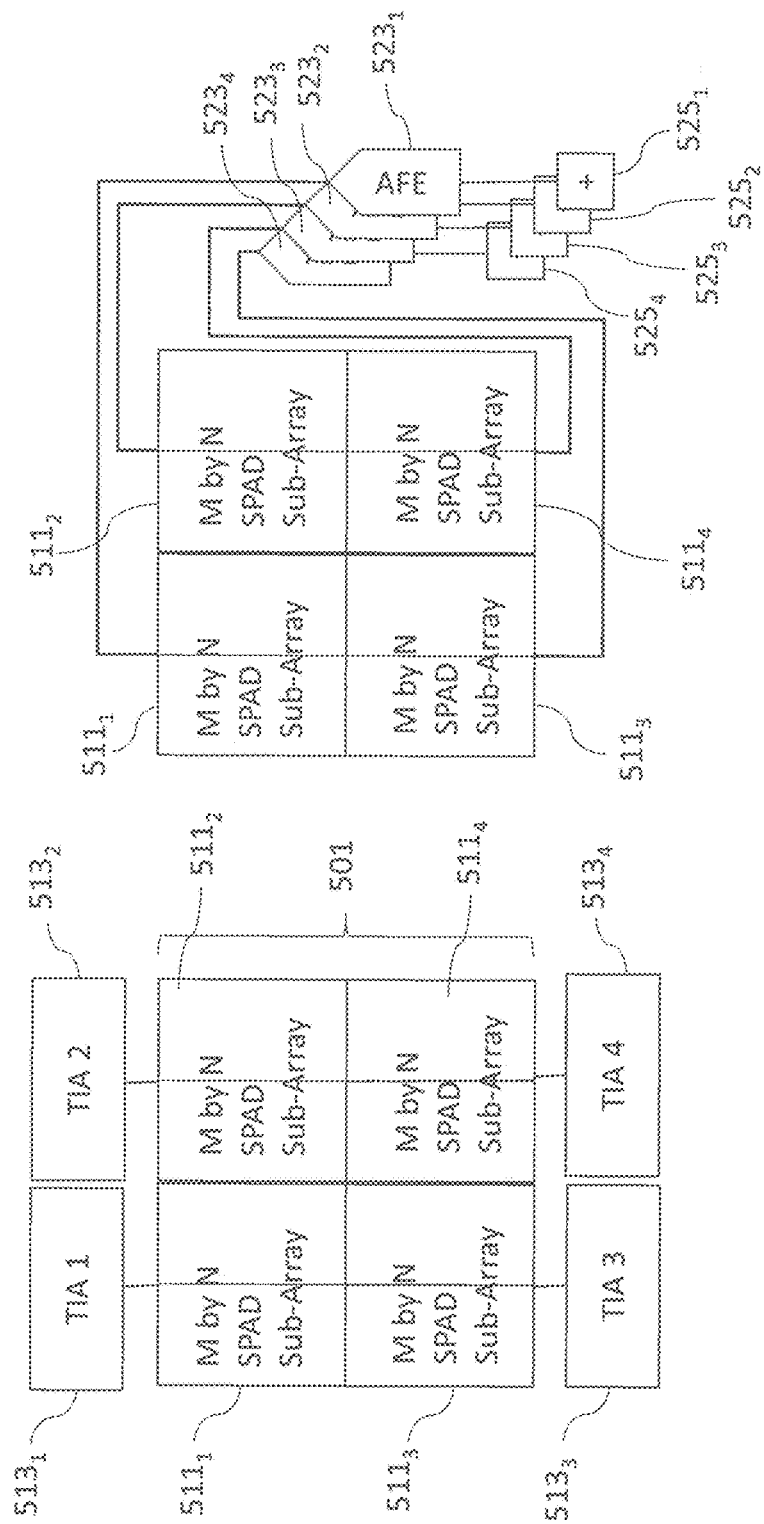
FIG. 5 shows a schematic view of example analog and digital output receiver array configurations suitable for implementing within the SPAD TOF according to some embodiments.

FIG. 5 further shows analog and digital output configurations for the receiver (SPAD return) arrays. For example FIG. 5 shows a first configuration whereby each sub-array of the M×N SPAD return array is configured to output at least one analog value which represents the light intensity striking the diodes within the sub-array area. The example shown in FIG. 5 shows four sub-arrays from the M×N number of arrays and thus shows a first sub-array $511_1$ configured to output analog signals to a first trans-impedance amplifier (TIA) $513_1$, a second sub-array $511_2$ configured to output analog signals to a second trans-impedance amplifier $513_2$, a third sub-array $511_3$ configured to output analog signals to a third trans-impedance amplifier $513_3$, and a fourth sub-array $511_4$ configured to output analog signals to a fourth trans-impedance amplifier $513_4$. It would be understood that in some embodiments the sub-arrays themselves comprise row and columns of diodes (or groups of diodes) which may represent picture elements (pixels), and that the light intensity for each pixel is output.

FIG. 5 shows a second (digital) configuration wherein each sub-array of the return array is configured to output a 'digital' value. Thus the same four sub-arrays are shown where the first sub-array $511_1$ is coupled to a first analog front end (AFE) $523_1$ which is coupled to a first summing device $525_1$, a second sub-array $511_2$ is coupled to a second AFE $523_2$ which is further coupled to a second summing device $525_2$, a third sub-array $511_3$ is coupled to a third AFE $523_3$ which is coupled to a third summing device $525_3$ and a fourth sub-array $511_4$ is coupled to a fourth AFE $523_4$ which is further coupled to a fourth summing device $525_4$. The AFE may comprise analog processing circuitry and an analog to digital converter (ADC). The summing device may comprise a digital binary summing circuit.

In implementing the transmitter and receiver arrays it may be possible to generate a plurality of light spots or pattern elements onto receiver array sub-arrays such that each spot is configured to be received by a separate array sub-array and in such a manner a plurality of separate light communication channels be formed between the transmitter and receiver.

Figure 6:
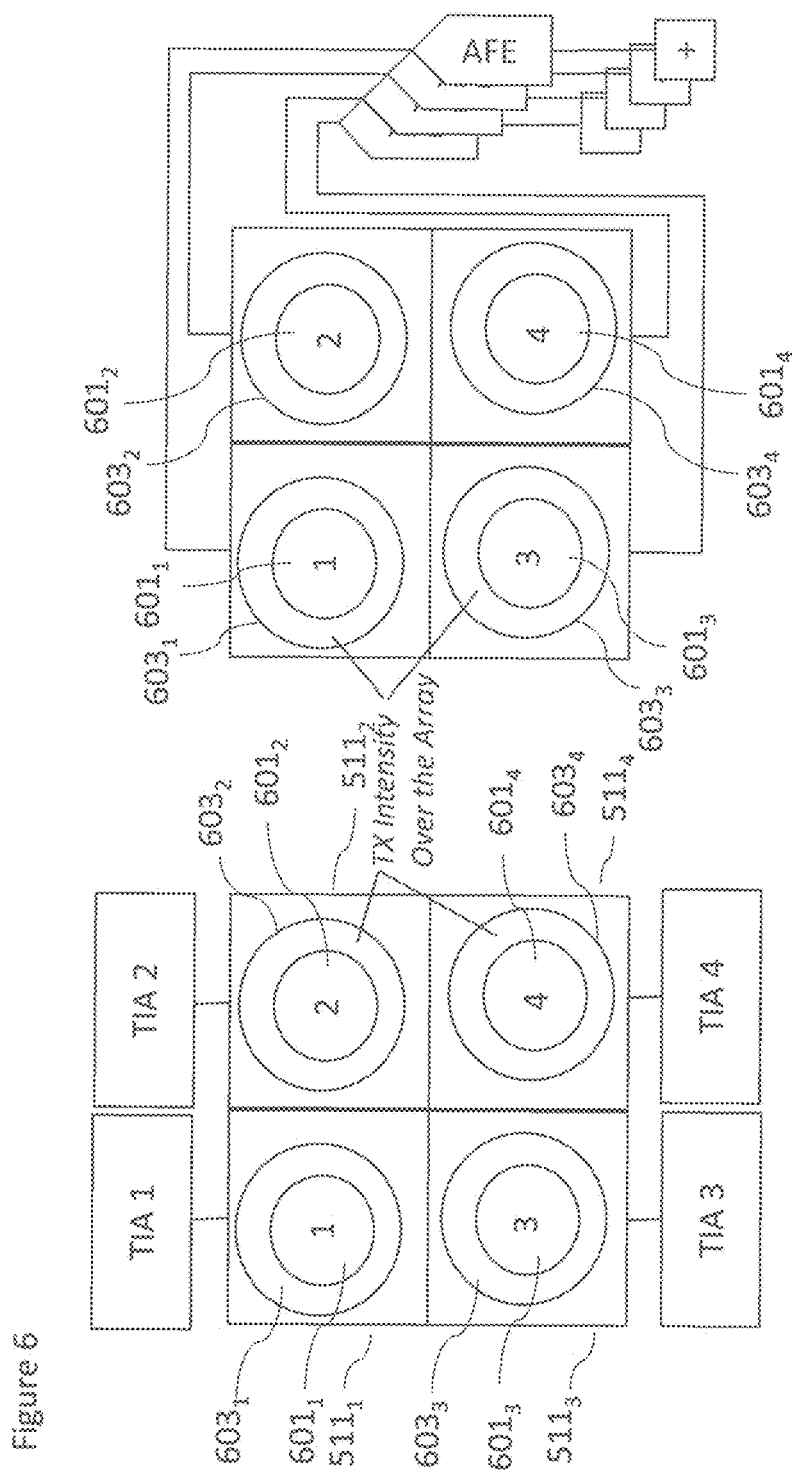
FIG. 6 shows a schematic view of ideal multichannel light intensity distributions received at the example analog and digital output receiver array configurations shown in FIG. 5.

An example of which is shown in FIG. 6 where ideal spatial channel separation is shown for the analog and digital configurations shown in FIG. 5. The first and second arrangements of FIG. 5 are shown in FIG. 6 with the light intensity of four separate transmitted 'spatial channel' spots or patterns located on the return array such that each spot is located on a different (or associated) return array sub-array. The use of commercial lenses with non-ideal optical characteristics may cause the receiver array sub-arrays to receive a light intensity profile where for each transmitter 'spot' or pattern there is a received high (or higher) signal region where a majority of signal energy is received but also a low (or lower) signal region surrounding the high signal region. The relative shape and size of the high and low signal regions may change from use case to use case.

The first sub-array $511_1$ is shown with a high signal (intensity) region $601_1$ and a low signal (intensity) region $603_1$ from the transmitted first channel, the second sub-array $511_2$ is shown with a high signal (intensity) region $601_2$ and a low signal (intensity) region $603_2$ from the transmitted second channel, the third sub-array $511_3$ with a high signal (intensity) region $601_3$ and a low signal (intensity) region $603_3$ from the transmitted third channel, and a fourth sub-array $511_4$ with a high signal (intensity) region $601_4$ and a low signal (intensity) region $603_4$ from the transmitted fourth channel.

In the example shown in FIG. 6 it may be possible to transmit and receive Q separate spatial channels (where Q is the smallest number of the transmitter elements and the receiver array sub-arrays) and therefore enable the transmission of Q×W bits/second of data where each channel can transmit W bits/second of data. For instance the examples shown in FIGS. 5 and 6 may permit a 4× increase of bandwidth over a single channel transmission channel.

In practice an 'ideal' spatial separation of channels may be difficult to achieve at the receiver. Relative motion between the transmitter and receiver devices may cause the transmitted spots to be detected at receiver sub-arrays other than the expected sub-array causing cross talk between the channels. Similarly any misalignment between the transmitter and receiver may cause some of the transmitted light energy for one channel to be received over more than one receiver array sub-array.

Figure 7:
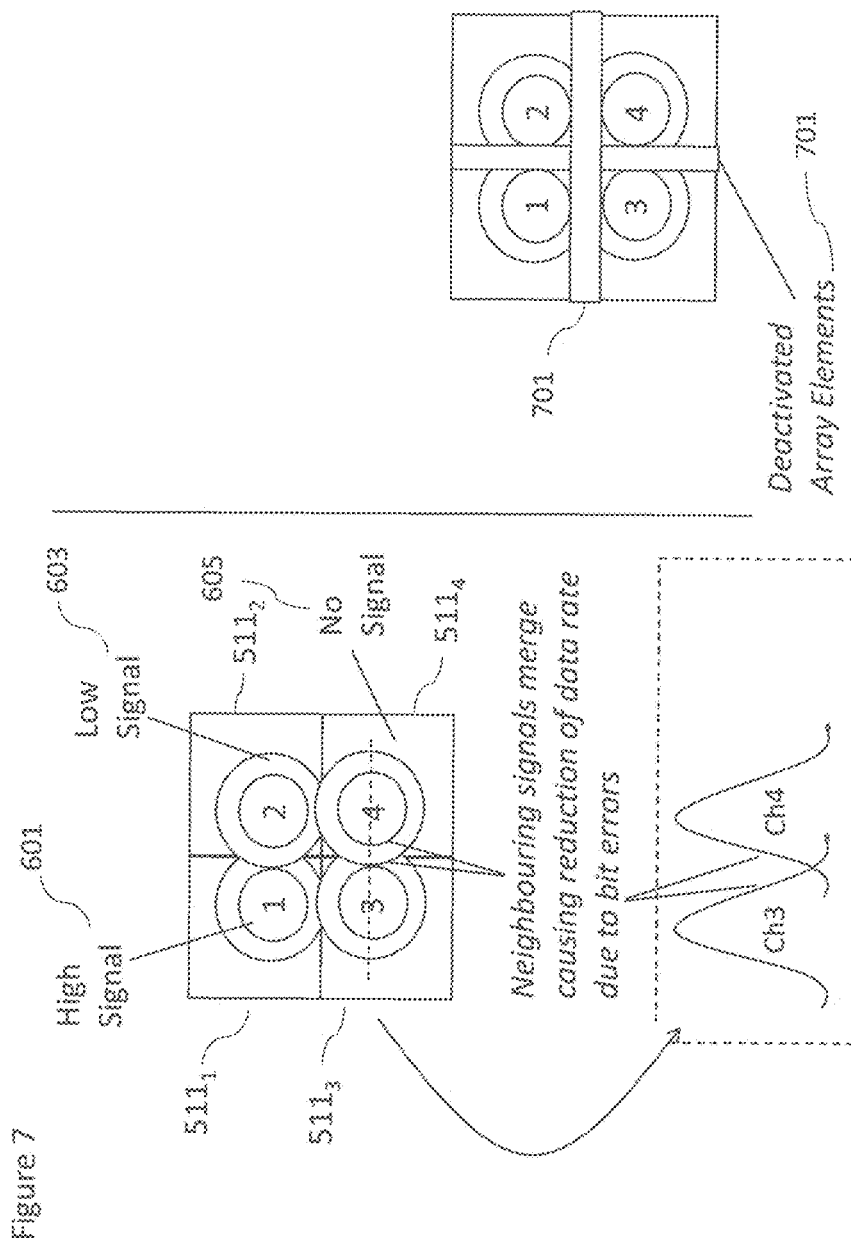
FIG. 7 shows a schematic view of a non-ideal multichannel light intensity distribution and a control of the receiver array to remove/reduce light cross talk in receiver array configurations such as shown in FIG. 5.

For example FIG. 7 shows an example where spatial separation of the transmitted light does not produce clear separate optical beam channels at the receiver. This lack of spatial separation can thus produce regions where neighboring or adjacent channels signals merge causing a reduction of data rate due to cross-talk. This can be seen for example in the 2×2 sub-array configuration in FIG. 7 where the sub-arrays $511_1$, $511_2$, $511_3$ and $511_4$ have separate high signal regions 601 and shown by the references 1 to 4.

However FIG. 7 shows where associated low signal regions 603 for adjacent channels overlap (for example the low signal regions 603 overlap between channels 1-2, 1-3, 2-4, and 3-4). This overlap means that there is no separation of channels by no signal regions 605. This lack of separation between channels can produce interference and noise (cross-talk) between the spatially adjacent channels such as shown in the graph in FIG. 7 where channel 3 and channel 4 have a region of overlapping signal intensity. This crosstalk decreases the effective data transfer rate between the transmitter and receiver as the signal to noise ratio decreases and the error rate increases for the channel.

In some embodiments a non-ideal channel spatial separation can be detected and allowed for and the effects of the cross-talk removed. For example in some embodiments where it is detected that a neighboring or adjacent light channel is being received on a sub-array it may be possible to 'de-activate' any sub-array elements which are detecting the neighboring light and thus restore spatial separation in order to improve the bit error rate (BER) and therefore enable higher speed communications to occur.

This for example is shown in FIG. 7 where the four sub-arrays are shown with deactivated array elements 701 separating each channel where the low signal merging occurs.

In some embodiments the control of deactivating array elements may be performed as part of an initialization or training sequence prior to the transmission of data. For example in some embodiments a test sequence may be generated where each channel is transmitted separately and the receiver then compensates for any potential overlap in the array.

Figure 8:
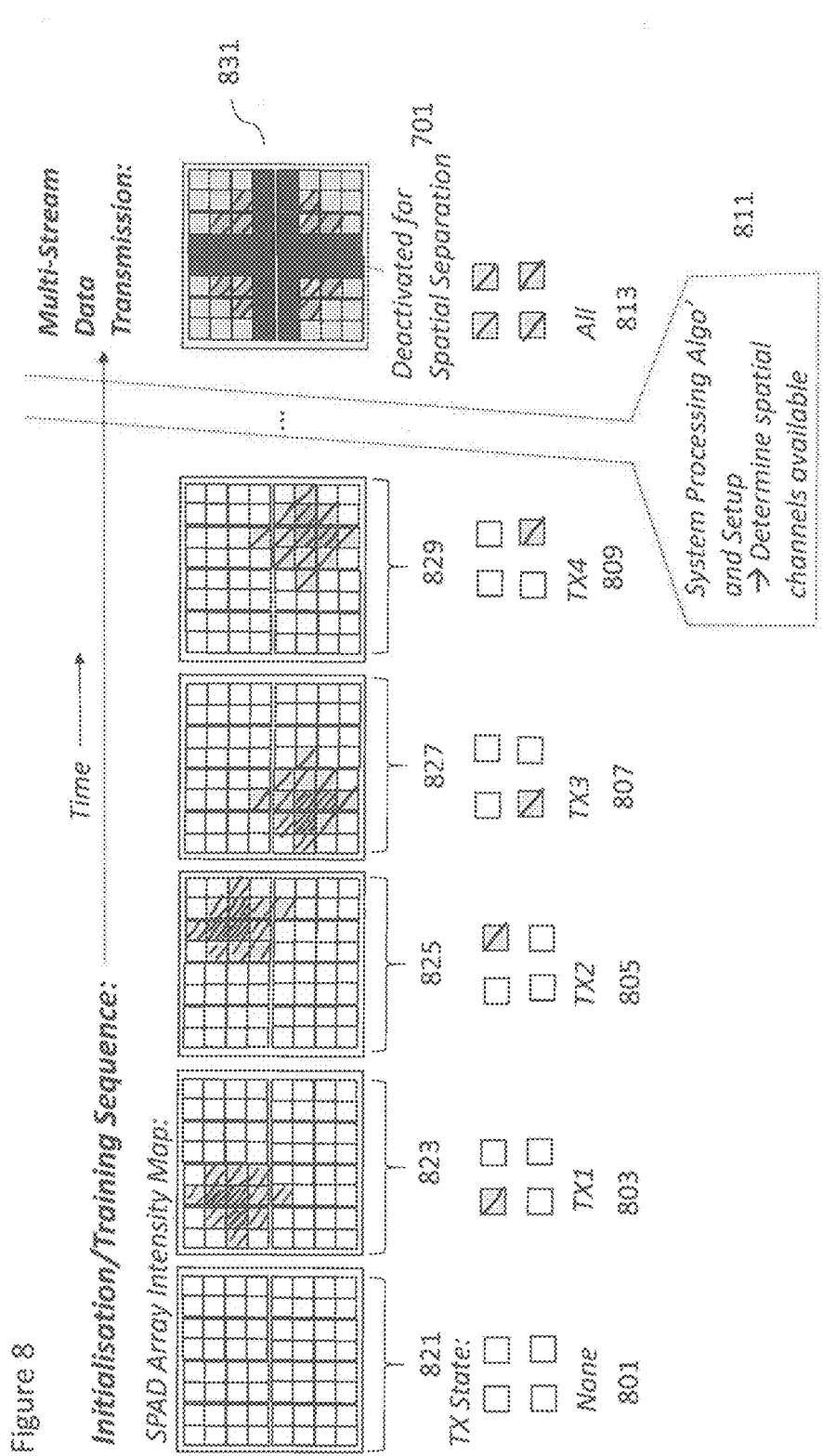
FIG. 8 shows an example training sequence and data transmission configuration according to some embodiments.

FIG. 8 shows an example training sequence for a 2×2 transmitter/receiver array configuration. In this example the training sequence comprises the following transmission states:

Firstly (as shown in the first image 801): none of the transmission channels are activated and a first SPAD array intensity map 821 is generated which may be used as a background or baseline intensity map.

Secondly (as shown in the second image 803): a first transmission channel TX1 is activated and a second SPAD array intensity map 823 is generated. The intensity map indicates the sub-array where the first transmitter element will be received but also sub-array elements where the first transmission channel may generate cross talk on the other sub-arrays.

Thirdly (as shown in the third image 805): a second transmission channel TX2 is activated and a third SPAD array intensity map 825 is generated. The intensity map indicates the sub-array where the second transmitter element will be received but also sub-array elements where the second transmission channel may generate cross talk on the other sub-arrays.

Fourthly (as shown in the fourth image 807): a third transmission channel TX3 is activated and a fourth second SPAD array intensity map 827 is generated. The intensity map indicates the sub-array where the third transmitter element will be received but also sub-array elements where the third transmission channel may generate cross talk on the other sub-arrays.

Fifthly (as shown in the fifth image 809): a fourth transmission channel TX4 is activated and a fifth SPAD array intensity map 829 is generated. The intensity map indicates the sub-array where the fourth transmitter element will be received but also sub-array elements where the fourth transmission channel may generate cross talk on the other sub-arrays.

Having generated the intensity maps a controller may then perform a system processing algorithm and setup operation (as shown by the operation 811) in order to determine the number and configuration of the received spatial channels. The controller having determining the first to fifth intensity maps for the example shown in FIG. 8 may determine that there are four transmission channels. Furthermore the controller may be configured to determine that in order to preserve an acceptable signal to noise ratio and eliminate cross-talk between the channels certain array elements (which may be individual diodes, groups of diodes or rows and/or columns of diodes in the receiver array) are to be 'deactivated' (or the output ignored).

Thus when the system is operated in full transmission mode where all the channels are transmitted (such as shown in the sixth image 813) the de-activated sub-array elements (shown in FIG. 8 by the black pixels 701) generate the spatial separation of the channels as shown by the multi-channel data transmission intensity map 831.

The sequence of activation as shown in FIG. 8 is an example only and any other sequence or order of activation may be implemented. Furthermore where there are large numbers of sub-arrays the sequence or order of transmission channel activation may enable multiple channels to be activated at the same time to reduce the overall test cycle time. These multiple channels may be selected such that the channels are expected not to overlap. Thus for example in the example shown in FIG. 7 where only adjacent channels are expected to overlap the test sequence may be to activate the following channel sequence {none, channels 1+4 together, channels 2+3 together}. The resulting intensity map for the second operation of the sequence can then be used to determine the deactivated diodes for the second and third sub-arrays. Similarly the resulting intensity map for the third operation of the above sequence can then be used to determine the deactivated diodes for the first and fourth sub-arrays.

In some embodiments the communications system may use a feedback loop to communicate the results of the initialization or training sequence in order to further control the number of channels transmitted.

Figure 9:
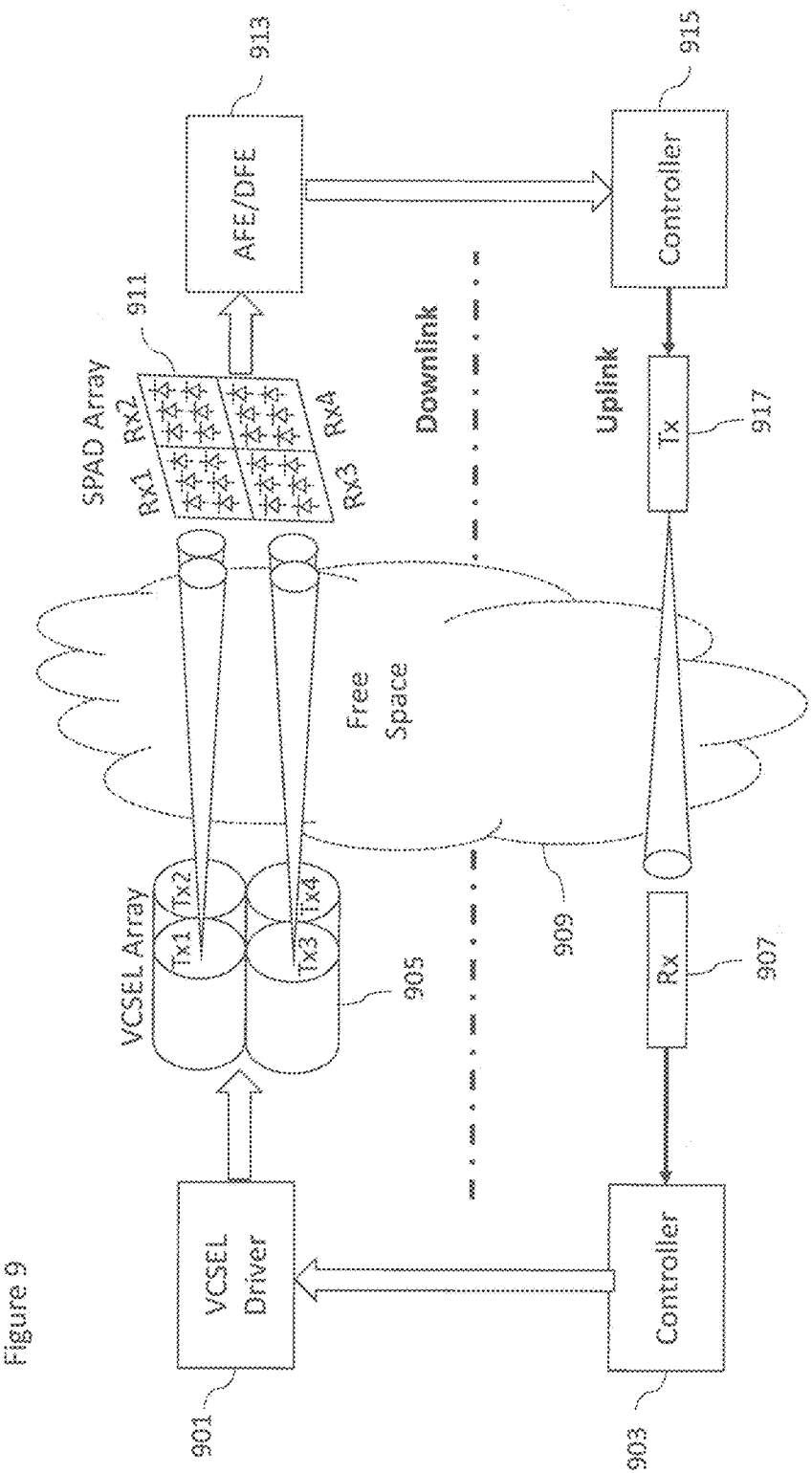
FIG. 9 shows an example feedback system for controlling transmission channel configuration according to some embodiments.

FIG. 9 shows an example overview of a system to perform the test/initialization operations shown in FIG. 8. Furthermore FIG. 9 shows that the system is able to implement the feedback loop. In this example a first device is shown comprising a transmitter controller 903. The transmitter controller 903 may control the operation of a VCSEL driver 901. For example the transmitter controller 903 may be any at least one processor and associated memory for generating training/initialization sequences and furthermore controlling the transmission of data in terms of number/configuration of transmission channels, the modulation scheme and rate applied to each channel etc.

The VCSEL driver 901 in turn powers the VCSEL array 905. In the example shown in FIG. 9 the VCSEL array is a 2×2 transmitter array but as described earlier the array may comprise any suitable pattern or number of elements. The VCSEL array comprises the light source elements for generating the transmission channels TX1 to TX4 over the free space 909 environment.

A second device is furthermore shown with a SPAD array 911 (which in this example) comprises a 2×2 configuration of sub-arrays of SPAD elements which output received values to an analog front end (AFE) and/or digital front end (DFE) 913. The AFE/DFE 913 in turn outputs values to a receiver controller 915. The receiver controller 915 may be configured to control the reception of the data.

Thus in the example shown in FIG. 8 the transmitter controller 903 is configured to generate the test sequences shown in FIG. 8 where none of the transmission channels are activated and then individual/groups of channels are activated. The receiver controller 915 can then receive the intensity maps and from these determine which sub-array elements are to be deactivated in order to maintain spatial separation of the channels. The transmitter controller 903 can then operate in transmission mode and transmit the channels and the receiver controller 915 decode/demodulate the signals received to determine the transmitted data.

The second device may furthermore comprise a (uplink or feedback) transmitter 917 configured to transmit an uplink communications channel to the first device comprising a (feedback or uplink) receiver 907. The transmitter 917 and the receiver 907 may in some embodiments further comprise a VCSEL/SPAD array communicating over the free space environment 909 or may be any suitable communications path and thus any suitable transmitter/receiver technology. In some embodiments the receiver or second device controller 915, may be configured to characterize the communications path from the first device to the second device.

For example the receiver controller 915 may be configured to determine a quality of the communications from the first device to the second device in a quantitative manner (for example bit-error rate per channel, number of deactivated elements per sub-array). This characterization may be passed to the first device and the first device determine whether the number of channels or spatial configuration of channels is to be changed. For example where adjacent channels produce overlapping intensity maps which significantly overlap and require a significant portion of the sub-array elements to be deactivated in order to achieve channel separation the controller may determine that one or other of the adjacent channels are to be deactivated (or to transmit the same data and thus be considered to be a single channel).

In some embodiments the controller of the second device may determine whether to change the configuration of the transmission channels based on the determined intensity maps and indicate to the first device the number of and configuration of the spatial transmission channels.

In some embodiments this feedback may be generated and passed via the uplink to monitor channel spatial separation during data transmission. In other words an adaptive data rate may be controlled by changing the number and/or arrangement of transmission channels. This adaptation may enable the system to operate in various array configurations. For example the system may be operated in a maximum channel configuration (defined by the lower of transmitter or receiver elements)) where alignment is optimal and/or relative motion is minimal, a series of variable multichannel configurations where the alignment is less than optimal and/or there is some movement relative between the transmitter and receiver, or a single 1×1 configuration where there is a significantly long distance or significant spatial channel merging or relative movement between the transmitter and receiver. These transmission modes may be dynamically controlled during communications in order to attempt to achieve as high a bit rate as possible without degrading the quality (BER) of the communications link.

Figure 10A:
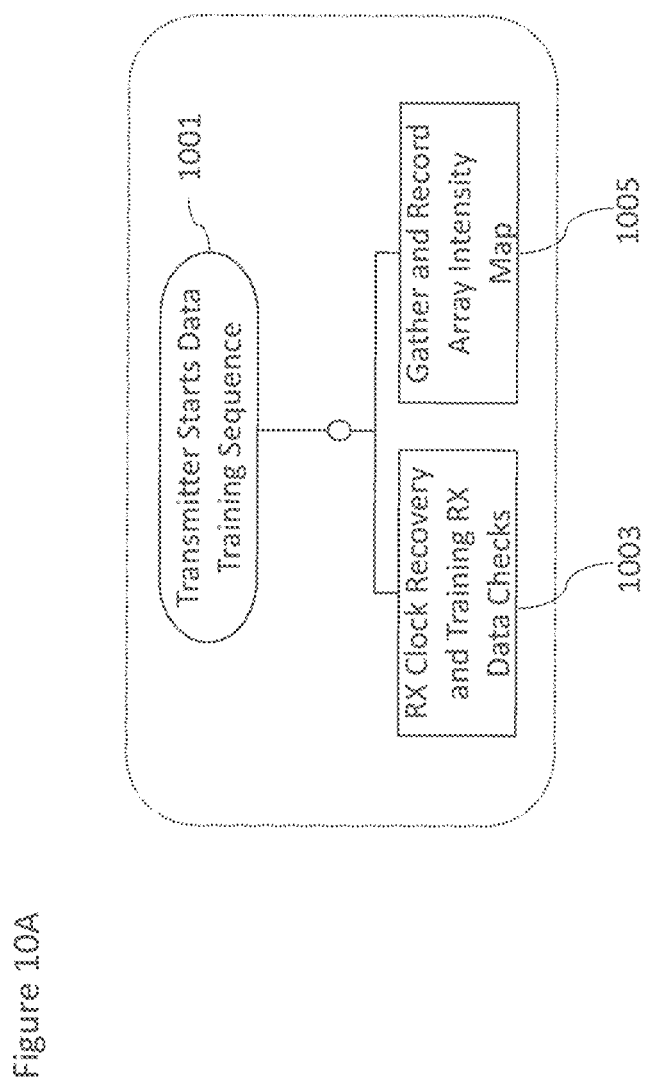
FIGS. 10A and 10B show example initialization training sequence methods.
Figure 10B:
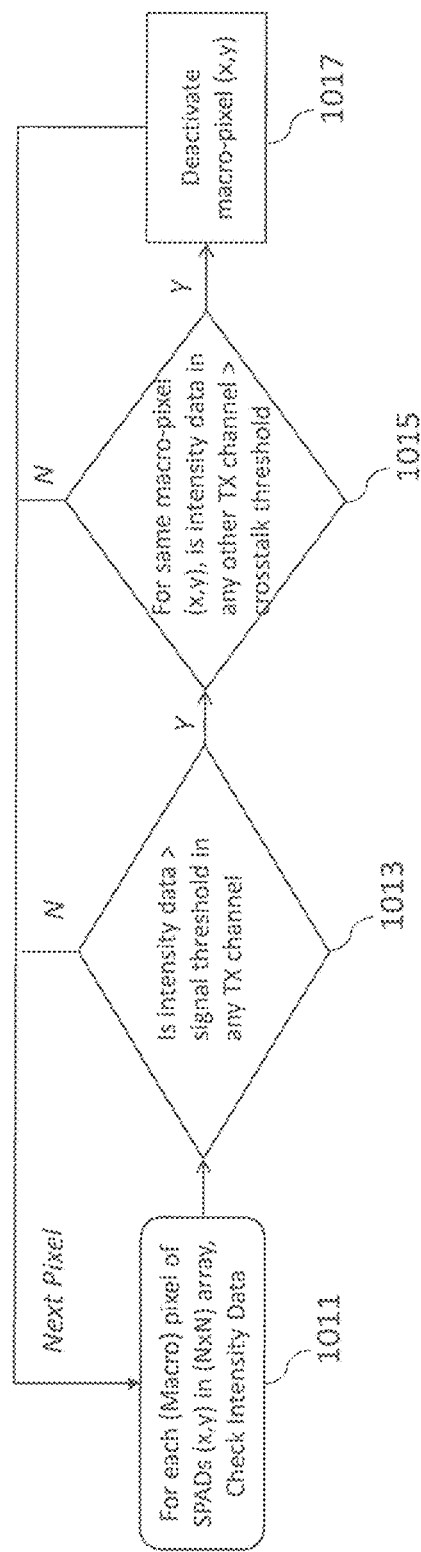

With respect to FIGS. 10A and 10B example flow diagrams for performing the operations described herein are further explained.

FIG. 10A for example describes an overview of the operations for starting or initializing communications according to some embodiments.

The first operation with respect to the method is shown in step 1001 where the transmitter starts to transmit the data training sequence. As described previously, the data training sequence may be the operations of establishing a baseline or background receiver level by initially switching off all of the transmission channels (switching off all of the VCSEL array elements), and then stepping through the training sequence of transmission channels. For example as shown with respect to FIG. 8, stepping incrementally through each transmission channel (switching on each VCSEL array element). In some embodiments the training sequence includes transmitting a clock or other synchronization signal.

The following operations with respect to the method are shown in steps 1003 and 1005.

In step 1003 the receiver, having received the data training sequence uses the received signal to perform clock recovery in order to enable synchronization between the transmitter and receiver. Furthermore in some embodiments the receiver may be configured to perform training receiver data checks.

In step 1005, the receiver may gather and record array intensity maps based on the training sequence. Furthermore the receiver may be configured to use these array intensity maps to determine whether the channel separation is sufficient and, where it is not sufficient, to perform the array element deactivation required to establish spatial separation for each channel. Furthermore, in some embodiments, this data may be fed back to the transmitter to determine the number of transmission channels and/or the configuration or arrangement of transmission channels.

With respect to FIG. 10B the initialization training sequence intensity map processing operations according to some embodiments are shown. The operation begins with the generated intensity maps being analyzed on a pixel by pixel basis.

With respect to a first operation in the cycle, as shown in FIG. 10B by step 1011, the intensity data associated with a (macro) pixel of SPADs (x,y) within a sub-array (M×N) is selected.

The processor may then compare the selected intensity data against a signal threshold value in any transmission channel.

The operation of comparing the intensity data for the selected (macro) pixel against a signal threshold is shown in FIG. 10B by step 1013.

Where the intensity data value for the (macro) pixel is not greater than the threshold for any transmission channel then the sequence passes to the selection of the next (macro) pixel. In other words the (macro) pixel selected is within a no-signal region for all of the transmission channels and no-cross talk or negligible signal and cross talk is occurring for this (macro) pixel.

Where the intensity data value for the (macro) pixel is greater than the threshold for any transmission channel then for the same (macro) pixel the intensity data for any other transmission channel is checked against a cross-talk threshold value. In other words the method determines whether for any (macro) pixel receiving at least one transmission channel signal sufficiently strongly to register as detecting that transmission channel whether the same (macro) pixel detects another transmission channel.

The operation of comparing the intensity data value for the selected (macro) pixel against a cross talk threshold value for any other transmission channel is shown in FIG. 10B by step 1015.

Where the intensity data value for the (macro) pixel is less than the crosstalk threshold value then the sequence passes to the selection of the next (macro) pixel.

Where the intensity data value for the (macro) pixel is greater than the crosstalk threshold value then then the (macro) pixel can be deactivated and the sequence selects the next (macro) pixel.

The operation of deactivating the (macro) pixel is shown in FIG. 10B by step 1017.

The above operations may furthermore be modified in some embodiments to permit continuous monitoring of the spatial separation of the transmission channels. For example FIGS. 11A and 11B show similar processes for continuous monitoring.

Figure 11A:
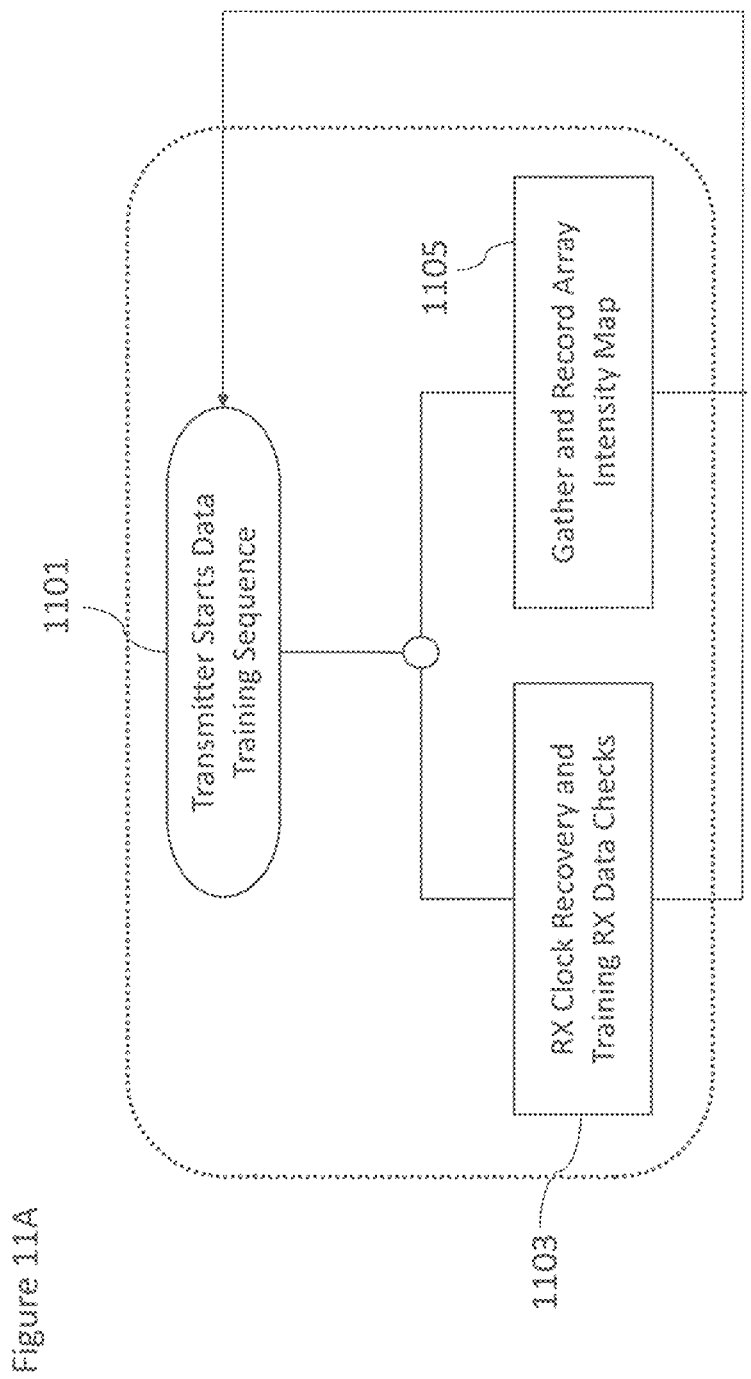
FIGS. 11A and 11B show example data training sequence methods.
Figure 11B:
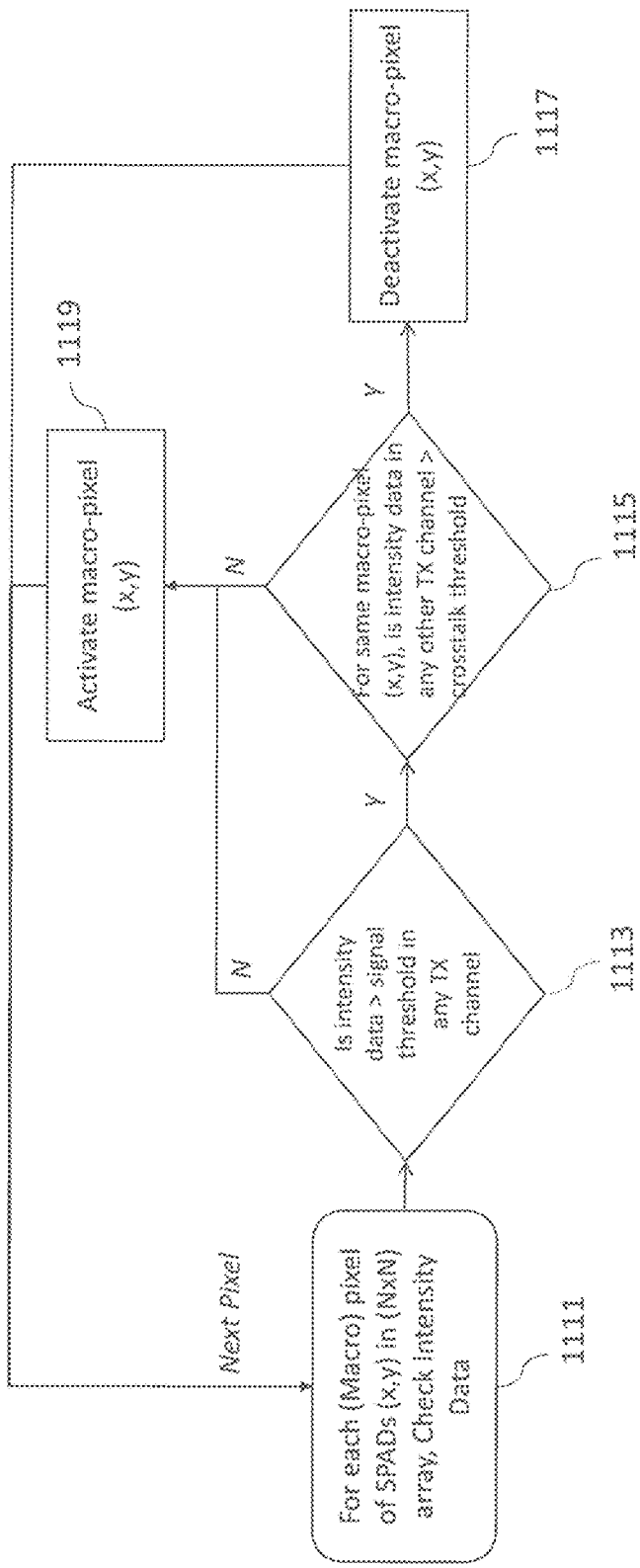

FIG. 11A for example describes an overview of the operations for monitoring spatial channel separation in communications according to some embodiments.

The first operation with respect to the method is shown in step 1101 where the transmitter starts to transmit the data training sequence. As described previously, the data training sequence may be the operations of establishing a baseline or background receiver level by initially switching off all of the transmission channels (switching off all of the VCSEL array elements), and then stepping through the training sequence of transmission channels. For example as shown with respect to FIG. 8, stepping incrementally through each transmission channel (switching on each VCSEL array element). In some embodiments the training sequence includes transmitting a clock or other synchronization signal.

The following operations with respect to the method are shown in steps 1103 and 1105.

In step 1103 the receiver, having received the data training sequence uses the received signal to perform clock recovery in order to enable synchronization between the transmitter and receiver. Furthermore in some embodiments the receiver may be configured to perform training receiver data checks.

In step 1105 the receiver, may gather and record array intensity maps based on the training sequence. Furthermore the receiver may be configured to use these array intensity maps to determine whether the channel separation is sufficient and where it is not sufficient then performing the array element deactivation required to establish spatial separation for each channel. Furthermore in some embodiments this data may be fed back to the transmitter to determine the number of transmission channels and/or the configuration or arrangement of transmission channels.

Following the execution of steps 1103 and 1105 the method may then pass back to step 1101 where a new training sequence is executed and thus updated clock and intensity maps may be generated.

With respect to FIG. 11B the initialization training sequence intensity map processing operations according to some embodiments are shown. The operation begins with the generated intensity maps being analyzed on a pixel by pixel basis.

With respect to a first operation in the cycle, as shown in FIG. 10B by step 1111, the intensity data associated with a (macro) pixel of SPADs (x,y) within a sub-array (M×N) is selected.

The processor may then compare the selected intensity data against a signal threshold value in any transmission channel.

The operation of comparing the intensity data for the selected (macro) pixel against a signal threshold is shown in FIG. 10B by step 1113.

Where the intensity data value for the (macro) pixel is not greater than the threshold for any transmission channel then the sequence passes to step 1119. In step 1119 the (macro) pixel is activated and the sequence selects the next (macro) pixel. In other words the (macro) pixel selected is activated and the intensity values associated with the (macro) pixel used.

Where the intensity data value for the (macro) pixel is greater than the threshold for any transmission channel then for the same (macro) pixel the intensity data for any other transmission channel is checked against a cross-talk threshold value. In other words the method determines whether for any (macro) pixel receiving at least one transmission channel signal sufficiently strongly to register as detecting that transmission channel whether the same (macro) pixel detects another transmission channel.

The operation of comparing the intensity data value for the selected (macro) pixel against a cross talk threshold value for any other transmission channel is shown in FIG. 11B by step 1115.

Where the intensity data value for the (macro) pixel is less than the crosstalk threshold value then the (macro) pixel is activated such as shown in step 1119 and sequence passes to the selection of the next (macro) pixel.

Where the intensity data value for the (macro) pixel is greater than the crosstalk threshold value then then the (macro) pixel can be deactivated and the sequence selects the next (macro) pixel.

The operation of deactivating the (macro) pixel is shown in FIG. 11B by step 1117.

Figure 12:
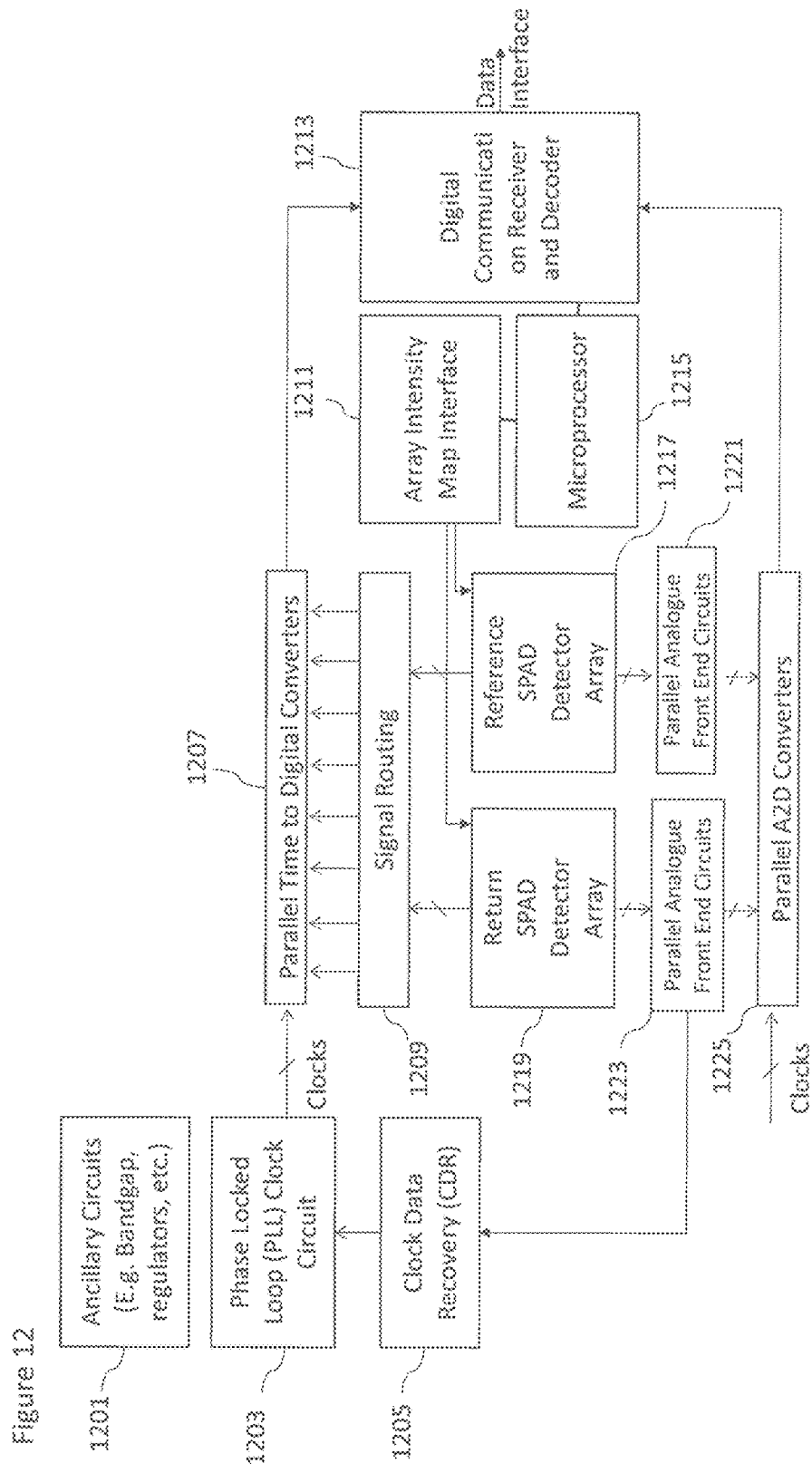
FIG. 12 shows a schematic block diagram of a transceiver module according to some embodiments.

With respect to FIG. 12 an example apparatus suitable for implementing embodiments of the application as described above is shown. The apparatus comprises the reference SPAD detector array 1217 and the return SPAD detector array 1219. These both output signal values to a signal routing block 1209 which couple the detector arrays to parallel time to digital converters 1207. The output of the parallel time to digital convertors can be passed to the digital communication receiver and decoder 1213.

The detector arrays are furthermore coupled to parallel analog front end (AFE) circuits 1223 and 1221. The parallel AFE circuits in some embodiments output a signal to a clock data recovery module 1205. The clock data recovery module may then provide an input to a phase locked loop (PLL) clock circuit 1203. The PLL clock circuit furthermore may be used to provide the clock input to the parallel time to digital converters 1207.

The parallel analog front end (AFE) circuits 1223 and 1221 furthermore may be configured to output signals to parallel analog to digital (A2D) converters 1225. The PLL clock circuit furthermore may be used to provide the clock input to the parallel A2D converters 1225.

The parallel A2D converters 1225 and the parallel time to digital converters 1207 output signals to the digital communication receiver and decoder 1213. The digital communication receiver and decoder 1213 may be configured to use the signals to generate the received data signals and also to pass the intensity values to the microprocessor 1215 which is configured to generate and analyses the intensity maps as described herein. The analysis may be passed to the array intensity map interface which is configured to activate and deactivate the macro pixels (in other words enable and disable the macro pixel outputs) in order to enable the control of transmission channel spatial separation and furthermore control of the number and arrangement of transmission channels received at the apparatus. The apparatus may further comprise ancillary circuits 1201, such as bandgap regulators etc configured to assist the operation of the apparatus.

Some embodiments may use other sensors, instead of SPADs. These sensors may be integrating photo-sensitive elements capable of receiving light intensity, time of arrival, frequency or phase or amplitude/intensity modulation, wavelength (color) or other information.

It should be appreciated that the above described arrangements may be implemented at least partially by an integrated circuit, a chip set, one or more dies packaged together or in different packages, discrete circuitry or any combination of these options.

Various embodiments with different variations have been described here above. It should be noted that those skilled in the art may combine various elements of these various embodiments and variations.

Such alterations, modifications, and improvements are intended to be part of this disclosure, and are intended to be within the scope of the present invention. Accordingly, the foregoing description is by way of example only and is not intended to be limiting. The present invention is limited only as defined in the following claims and the equivalents thereto.

What is claimed is:

1. A single photon avalanche diode based apparatus comprising:
    an array of single photon avalanche diodes configured to receive light generated externally to the apparatus, wherein the array of single photon avalanche diodes is configurable to be sub-divided into a plurality of sub-arrays, each sub-array able to receive a separate free space light communication channel, wherein each of the plurality of sub-arrays comprises an arrangement of diode elements;
    a receiver coupled to an output from each sub-array and configured to output data based on a plurality of sub-array separate free space light communication channel received from the sub-arrays; and
    a processor configured to:
        generate an array intensity map that comprises values of light intensity for each diode element based on the output of the array of single photon avalanche diodes;
        detect, within a sub-array diode element, a free space light communication channel and a further free space light communication channel; and
        deactivate the sub-array diode element such that no sub-array diode element receives more than one free space light communication channel.

2. The apparatus as claimed in claim 1 wherein the processor is further configured to generate a feedback message configured to control a number and/or arrangement of free space light communication channels to be transmitted to the apparatus.

3. The apparatus as claimed in claim 2, further comprising an array of illumination source elements configured to generate light, wherein each illumination source element is configurable to generate light for a transmitted spatially separate free space light communication channel, and wherein the feedback message is transmitted from the apparatus over the transmitted spatially separate free space light communication channel.

4. The apparatus as claimed in claim 3, wherein the array of illumination source elements comprise vertical cavity surface emitting laser elements.

5. The apparatus as claimed in claim 3, wherein the array of illumination source elements comprise light emitting diode elements.

6. The apparatus as claimed in claim 1, wherein the apparatus is a time of flight single photon avalanche diode based range detecting module.

7. A communications system that includes the apparatus as claimed in claim 1, wherein the apparatus is configured to receive a dynamically adjustable number of spatially separate free space light communication channels, the communications system further comprising:
    a second apparatus comprising an array of illumination source elements configured to generate light, wherein each illumination source element is configurable to generate light for a spatially separate free space light communication channel, and wherein the second apparatus is configured to provide the dynamically adjustable number of spatially separate free space light communication channels.

8. A single photon avalanche diode based apparatus comprising:

an array of illumination source elements configured to generate light, wherein each illumination source element is configurable to generate light for a spatially separate free space light communication channel;

a processor configured to:
sequentially activate the array of illumination source elements;
generate a respective array intensity map, comprising values of light intensity received by an array of photo receptors, for each illumination source element of the array of illumination source elements that is activated in sequence;
determine spatial locations of at least one photo receptor of the array of photo receptors that receives light intensity in two or more sequential activations of the array of illumination source elements; and
deactivate the at least one photo receptor in response to determining that the at least one photo receptor receives light intensity in two or more sequential activations of the array of illumination source elements.

9. The apparatus as claimed in claim 8, wherein the array of illumination source elements comprise vertical cavity surface emitting laser elements.

10. The apparatus as claimed in claim 8, wherein the array of illumination source elements comprise light emitting diode elements.

11. The apparatus as claimed in claim 8, wherein the array of photo receptors comprises:
an array of single photon avalanche diodes configured to receive light generated externally to the apparatus, wherein the array of single photon avalanche diodes is configurable to be sub-divided into a plurality of sub-arrays, each sub-array able to receive a separate free space light communication channel.

12. The apparatus as claimed in claim 11 wherein the apparatus is a time of flight single photon avalanche diode based range detecting module.

13. The apparatus as claimed in claim 11, further comprising:
a receiver configured to receive an output from each sub-array and output data based on received plurality of sub-array separate free space light communication channel, wherein the receiver is configured to receive a feedback message; and a processor configured to control the array of illumination source elements based on the received feedback message so to maintain is spatial separation of the free space light communication channels.

14. A method for operating single photon avalanche diode based apparatus, the method comprising:
configuring an array of single photon avalanche diodes to receive light generated externally to the apparatus by sub-dividing the array of single photon avalanche diodes into a plurality of sub-arrays, each sub-array able to receive a separate free space light communication channel, wherein each of the plurality of sub-arrays comprises an arrangement of diode elements;
receiving an output from each sub-array;
outputting data based on the received output and related to the separate free space light communication channels;
generating an array intensity map that comprises values of light intensity for each diode element based on the output of the array of single photon avalanche diodes;
detecting, within a sub-array diode element, a free space light communication channel and a further free space light communication channel; and
deactivating the sub-array diode element such that no sub-array diode element receives more than one free space light communication channel.

15. The method as claimed in claim 14, further comprising generating a feedback message configured to control a number and/or arrangement of free space light communication channels to be transmitted to the apparatus.

16. The method as claimed in claim 15, further comprising generating light using an array of illumination source elements, wherein each illumination source element is configurable to generate light for a transmitted spatially separate free space light communication channel, and wherein the feedback message is transmitted from the apparatus over the transmitted spatially separate free space light communication channel.

17. The method as claimed in claim 16, wherein the array of illumination source elements comprise vertical cavity surface emitting laser elements.

18. The method as claimed in claim 16, wherein the array of illumination source elements comprise light emitting diode elements.

* * * * *